United States Patent
Shaham et al.

(10) Patent No.: US 10,356,283 B2
(45) Date of Patent: Jul. 16, 2019

(54) GRAY COMPONENT REPLACEMENT IN A DIGITAL IMAGE TO GENERATE A COLOR TRANSFORMED IMAGE

(71) Applicant: HP INDIGO B.V., Amstelveen (NL)

(72) Inventors: Noam Shaham, Ness Ziona (IL); Liron Itan, Ness Ziona (IL); Mirta Perlman, Ness Ziona (IL); Oren Haik, Rehovot (IL); Oded Perry, Ness Ziona (IL); Tal Framk, Ness Ziona (IL); Ram Dagan, Modiin (IL); Gregory Braverman, Ness Ziona (IL)

(73) Assignee: HP Indigo B.V., Amstelveen (NL)

( * ) Notice: Subject to any disclaimer, the term of this patent is extended or adjusted under 35 U.S.C. 154(b) by 0 days.

(21) Appl. No.: 15/569,328

(22) PCT Filed: Jul. 24, 2015

(86) PCT No.: PCT/EP2015/067088
§ 371 (c)(1),
(2) Date: Oct. 25, 2017

(87) PCT Pub. No.: WO2017/016584
PCT Pub. Date: Feb. 2, 2017

(65) Prior Publication Data
US 2018/0124286 A1    May 3, 2018

(51) Int. Cl.
*H04N 1/60* (2006.01)
*G06K 15/02* (2006.01)

(52) U.S. Cl.
CPC ....... *H04N 1/6022* (2013.01); *G06K 15/1878* (2013.01); *H04N 1/6008* (2013.01); *H04N 1/6027* (2013.01); *H04N 2201/0082* (2013.01)

(58) Field of Classification Search
CPC .................... H04N 1/6022; H04N 1/6025
See application file for complete search history.

(56) References Cited

U.S. PATENT DOCUMENTS 7,623,265 B2 * 11/2009 Gotoh ............... H04N 1/60
358/1.9
7,952,759 B2   5/2011 Wang et al.
(Continued)

FOREIGN PATENT DOCUMENTS

CN    101523441    9/2009
JP    2000-316097   11/2000
(Continued)

OTHER PUBLICATIONS

Mestha, L.K. et al., Gray Balance Control Loop for Digital Color Printing Systems, Jun. 10, 2005.

*Primary Examiner* — Scott A Rogers
(74) *Attorney, Agent, or Firm* — HP Inc. Patent Department (57) ABSTRACT

Examples analyze a digital image to determine an amount of high-frequencies corresponding to each pixel of the digital image based at least in part on gradients corresponding to a pixel neighborhood of each pixel. Examples analyze the digital image to determine a degree of randomness for each pixel based at least in part on the corresponding gradients. Examples generate an activity mask for the digital image based at least in part on the amount of high-frequencies and the degree of randomness corresponding to each pixel. Examples process the pixels of the digital image by performing gray component replacement to generate a color transformed image based at least in part on the activity mask.

16 Claims, 7 Drawing Sheets

(56) References Cited

U.S. PATENT DOCUMENTS

| | | | |
|---|---|---|---|
| 8,305,645 B2 * | 11/2012 | Gotoh | H04N 1/6022 |
| | | | 358/1.9 |
| 8,422,103 B2 | 4/2013 | Qiao et al. | |
| 8,666,155 B2 | 3/2014 | Campbell | |
| 2005/0088673 A1 * | 4/2005 | Yokochi | H04N 1/58 |
| | | | 358/1.9 |
| 2006/0072127 A1 * | 4/2006 | Herron | H04N 1/6025 |
| | | | 358/1.9 |
| 2009/0279142 A1 | 11/2009 | Li et al. | |
| 2009/0296153 A1 | 12/2009 | Wang et al. | |
| 2014/0340697 A1 | 11/2014 | Kisilev et al. | |
| 2018/0060711 A1 * | 3/2018 | Tezuka | H04N 1/6027 |

FOREIGN PATENT DOCUMENTS

| | | |
|---|---|---|
| JP | 2001157066 | 6/2001 |
| JP | 2010-505342 | 2/2010 |
| JP | 2014-528224 | 10/2014 |
| WO | WO-2008042112 A2 | 9/2007 |
| WO | WO-2013048416 A1 | 4/2013 |

* cited by examiner

GRAY COMPONENT REPLACEMENT IN A DIGITAL IMAGE TO GENERATE A COLOR TRANSFORMED IMAGE

BACKGROUND

Digital images generally comprise a plurality of pixels, where the pixels correspond to a smallest controllable/addressable element of the digital image. A pixel generally comprises pixel values that correspond to various visual components of the respective pixel, such as color level, intensity, opacity, luminance, and/or other such visual components.

Throughout the drawings, identical reference numbers designate similar, but not necessarily identical, elements. Moreover the drawings provide examples and/or implementations consistent with the description; however, the description is not limited to the examples and/or implementations provided in the drawings.

DESCRIPTION

Generally, gray component replacement corresponds to a process by which a digital image may be processed to generate a color transformed image. Furthermore, gray component replacement may comprise adjusting color levels of pixels of a digital image. For example, gray component replacement may comprise increasing a black color level of a pixel and correspondingly decreasing other color levels of the pixel. For example, in some color spaces, a gray-color visual quality of a pixel may comprise a plurality of primary color levels. In such examples, printing of such pixel may therefore use an amount of printing material associated with each primary color level. From a visual standpoint however, for some pixels, a gray-color visual quality may be approximated by use of a black primary color, which may lead to printing material savings for primary colored printing material and/or overall printing material savings. Generally, printing material may refer to ink, toner, colourant, fluids, powders, and/or other such raw materials for printing that may be used by a printing device to print content.

As will be appreciated, a pixel of a digital image is generally represented by pixel values that correspond to visual components, where the visual components that may be expressed in pixel values may correspond to color level, intensity, hue, saturation, brightness, luminance, etc. For example, in a color space associated with cyan, magenta, yellow, and black primary colors, for a pixel, the pixel may be represented by a pixel value for the cyan color component, a pixel value for the magenta color component, a pixel value for the yellow color component, and a pixel value for the black color component. With regard to gray component replacement, therefore, performing gray component replacement may comprise adjusting pixel values corresponding to various color levels to thereby increase/decrease color levels.

For example, in a color space corresponding to cyan, magenta, yellow, and black (referred to as the CMYK color space), gray color generally comprises a combination of cyan, magenta, and yellow colors. In such examples, printing devices configured to print with the primary colors cyan, magenta, yellow, and black may therefore use an amount of printing material of the cyan, magenta, and yellow to achieve a gray color when printing pixels of a digital image having a gray color visual quality. Gray component replacement may be implemented such that a printing material of the black color may be used in some amount to reduce usage of the printing material for cyan, magenta, and yellow colors. As will be appreciated, such gray component replacement may reduce printing material usage in printing a digital image. However, performing gray component replacement in some portions of digital images may result in graininess and/or visual inaccuracies when outputting and/or printing such digital images.

Examples described herein generally balance between reducing printing material usage and maintaining visual appearance quality of printed content in processing digital images to perform gray component replacement to generate color transformed images. In some examples, an activity mask is generated for a digital image, and the digital image is processed based at least in part on the activity mask to thereby generate a color transformed image. Some examples generate the activity mask based at least in part on gradients determined for pixels of the digital image. Generally, the activity mask identifies a granular area of the digital image. Granular areas, such as areas corresponding to high-frequency random noise, generally comprise areas having grainy and/or grain-like visual characteristics (which may be referred to as granular visual characteristics). Examples provided herein may implement higher levels of gray component replacement in such granular areas because the grainy visual characteristics of such areas may mask the implementation of high levels of gray component replacement.

The granular area of the activity mask may be determined based at least in part on an amount of high-frequencies corresponding to each pixel of the digital image and/or a degree of randomness determined for each pixel of the digital image. Generally, granular areas of a digital image may correspond to areas having characteristics of high-frequency random noise, which generally corresponds an area (e.g., a group of neighboring pixels) having relatively higher amounts of high frequencies and having relatively higher degrees of randomness. In such granular areas, gray component replacement may be performed at higher levels, which generally corresponds to higher replacement of primary color levels with black color level.

In some examples, pixels corresponding to the granular area of the activity mask may have a relatively higher level of gray component replacement performed, while pixels not corresponding to the granular area identified by the activity mask may have lower levels of gray component replacement performed and/or gray component replacement may not be performed. Generally, a level of gray component replacement corresponds to a level of black color increase and a corresponding level of other color decrease. For example, in the CMYK color space, levels of gray component replacement generally increase a black color level and decrease a cyan color level, magenta color level, and/or yellow color level. In such examples, therefore, pixels of a digital image corresponding to a granular area identified by the activity mask may be processed by increasing a black color level and decreasing a cyan color level, a magenta color level, and/or a yellow color level, where the adjustment of color levels may correspond to a first gray component replacement level. In these examples, pixels of a digital image not corresponding to the granular area identified by the activity mask may be processed by increasing a black color level and decreasing a cyan color level, a magenta color level, and/or a yellow color level, where the adjustment of color levels may correspond to a second gray component replacement level. As will be appreciated, the first gray component replacement level may be relatively higher than the second gray component replacement level.

Figure 1:
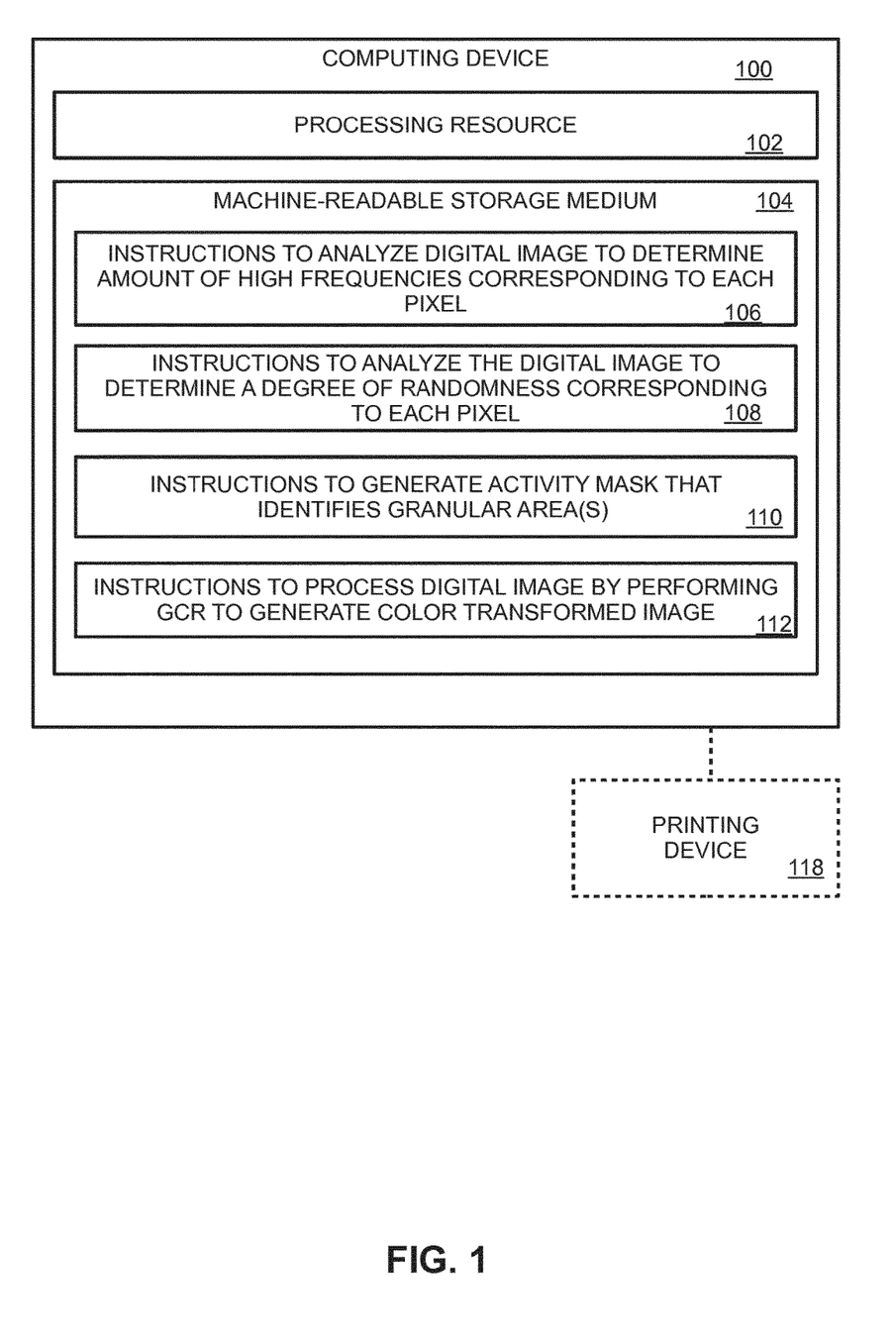
FIG. 1 is a block diagram of an example computing device.

Turning now to FIG. 1, this figure provides a block diagram that illustrates an example computing device 100. Examples of a computing device as disclosed herein include a personal computer, a portable electronic device (e.g., a smart phone, a tablet, a laptop, a wearable device, etc.), a workstation, smart device, server, a printing device, and/or any other such data processing devices. In this example, the computing device 100 comprises a processing resource 102 and a machine-readable storage medium 104, which may be referred to as a memory and/or a memory resource. In the examples described herein, a processing resource 102 may include at least one hardware-based processor. Furthermore, the processing resource 102 may include one processor or multiple processors, where the processors may be configured in a single computing device 100 or distributed across multiple computing devices connected locally and/or remotely. As will be appreciated, a processing resource 102 may comprise one or more general purpose data processors and/or one or more specialized data processors. For example, the processing resource 102 may comprise a central processing unit (CPU), a graphics processing unit (GPU), an application-specific integrated circuit (ASIC), and/or other such configurations of logical components for data processing.

The machine-readable storage medium 104 may represent the random access memory (RAM) devices comprising the main storage of the example computing device 100, as well as any supplemental levels of memory, e.g., cache memories, non-volatile or backup memories (e.g., programmable or flash memories), read-only memories, etc. In addition, machine-readable storage medium 104 may be considered to include memory storage physically located elsewhere, e.g., any cache memory in a microprocessor, as well as any storage capacity used as a virtual memory, e.g., as stored on a mass storage device or on another computing device in communication with the example computing device 100. Furthermore, the machine-readable storage medium 104 may be non-transitory.

Generally, the machine-readable storage medium 104 may be encoded with and/or store instructions that may be executable by the processing resource 102, where execution of such instructions may cause the processing resource 102 and/or computing device 100 to perform the functionalities, processes, and/or sequences of operations described herein. In this example, the machine-readable storage medium 104 comprises instructions for processing a digital image to generate a color transformed image. In particular, the machine-readable storage medium 104 comprises instructions to analyze a digital image to determine an amount of high frequencies corresponding to each pixel of the digital image based at least in part on gradients corresponding to a pixel neighborhood of each pixel 106. The machine-readable storage medium 104 comprises instructions to analyze the digital image to determine a degree of randomness corresponding to each pixel based at least in part on the corresponding gradients 108. In addition, the machine-readable storage medium 104 further comprises instructions to generate an activity mask for the digital image that identifies a granular area based at least in part on the amount of high frequencies and the degree of randomness corresponding to each pixel 110. Furthermore, the machine-readable storage medium 104 may comprise instructions to process each pixel of the digital image by performing gray component replacement (GCR) to generate a color transformed image based at least in part on the granular area identified by the activity mask 112.

While not shown in FIG. 1, for interface with a user or operator, some example computing devices may include a user interface incorporating one or more user input/output devices, e.g., one or more buttons, a display, a touchscreen, a speaker, etc. The user interface may therefore communicate data to the processing resource and receive data from the processing resource. For example, a user may input one or more selections via the user interface, and the processing resource may cause data to be output on a screen or other output device of the user interface. Furthermore, the computing device may comprise a network interface device. Generally, the network interface device comprises one or more hardware devices to communicate data over one or more communication networks, such as a network interface card.

In some examples, the computing device may be connected to an external output device, such as a printing device 118. External output devices may comprise a monitor, a touchscreen, a projection device, a personal display device, and/or other such types of visual output devices. Generally, printing device 118 may comprise a device configured to print content onto a physical medium.

Figure 2:
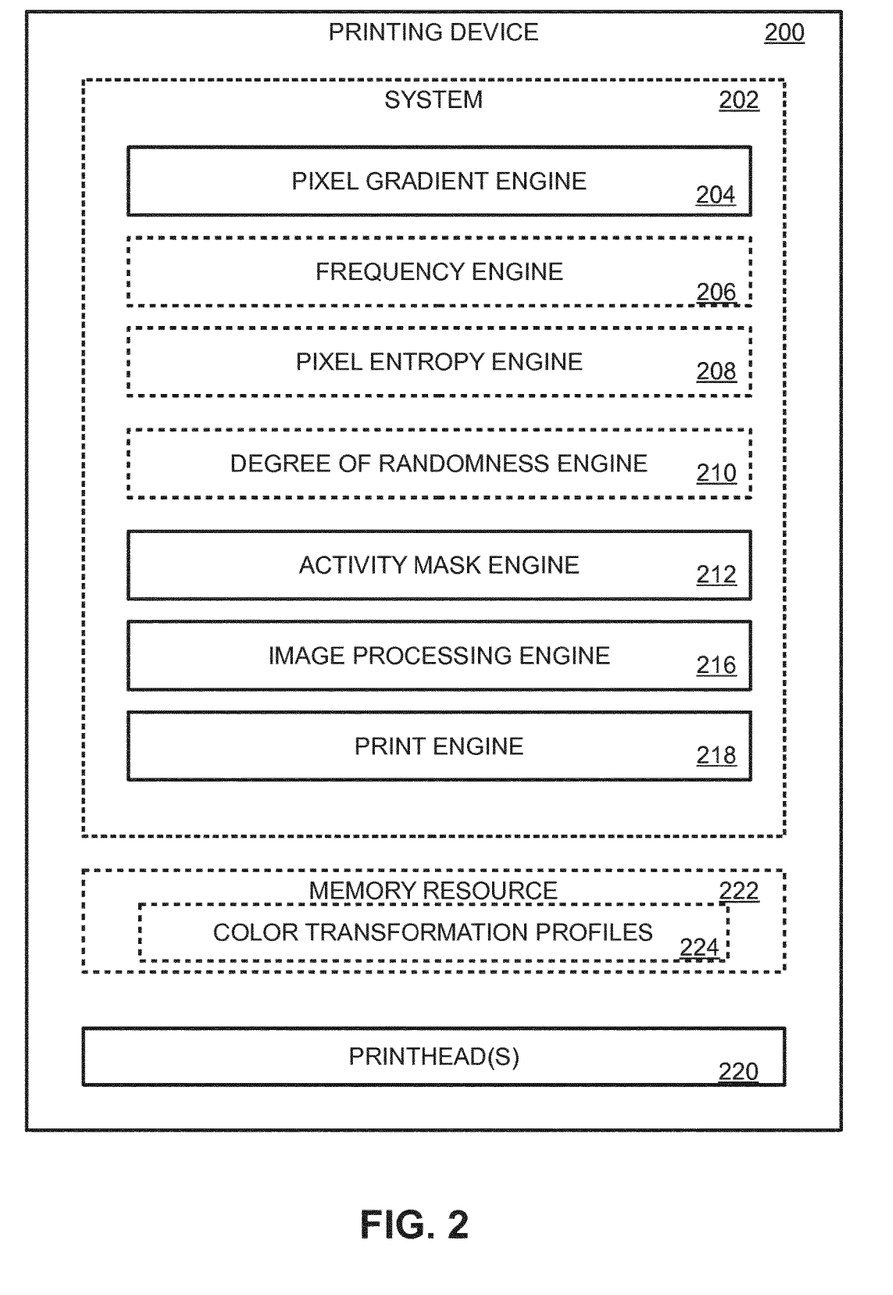
FIG. 2 is a block diagram of an example printing device.

FIG. 2 provides a block diagram of an example printing device 200. Printing devices, as described herein, may generally be used to print content onto a physical medium (also referred to as media), such as paper. Examples of printing devices include ink-based printing devices, toner-based printing devices, thermal printers, dye-based printers, three-dimensional printers, etc. Some examples may be configured to deliver/deposit printing material (e.g., fluids, powders, etc.) in a layer-wise additive manufacturing process. In some examples, the physical medium may comprise paper, and in other examples, such as three-dimensional printing devices, the physical medium may comprise powder-based build material. Printing material generally comprises consumable fluids as well as other consumable materials that may be depositied, positioned, and/or applied to a physical medium by a printing device.

In this example, the printing device 200 comprises a system 202 including engines 204-218 for processing a digital image. As will be appreciated, a digital image communicated to a printing device for printing thereby may be referred to as print content. Furthermore, engines, as described herein, may be any combination of hardware and programming to implement the functionalities of the respective engines. In some examples described herein, the combinations of hardware and programming may be implemented in a number of different ways. For example, the programming for the engines may be processor executable instructions stored on a non-transitory machine-readable storage medium and the hardware for the engines may include a processing resource to execute those instructions.

In these examples, a computing device implementing such engines may include the machine-readable storage medium storing the instructions and the processing resource to execute the instructions, or the machine-readable storage medium may be separately stored and accessible by the computing device and the processing resource. In some examples, engines may be implemented in circuitry. Moreover, processing resources used to implement engines may comprise one or more central processing units (CPU), one or more graphics processing units (GPU), one or more application specific integrated circuits (ASICs), and/or other such types of logical components that may be implemented for data processing.

In the example printing device 200 of FIG. 2, the printing device 200 includes a pixel gradient engine 204 to analyze pixels of a digital engine to determine, for each pixel, gradients corresponding to the pixel. The printing device 200 further includes a frequency engine 206 to generate, for the digital image, a high frequency map that indicates an amount of high frequencies corresponding to each pixel. Furthermore, the printing device 200 comprises a pixel entropy engine 208 to determine, for each pixel, an entropy corresponding to the pixel based at least in part on the gradients corresponding to the pixel. In addition, the printing device 200 comprises a degree of randomness engine 210 to generate a degree of randomness result that indicates a degree of randomness corresponding to each pixel based at least in part on the entropy corresponding to each pixel. The printing device 200 also comprises an activity mask engine 212 to generate an activity mask for the digital image based at least in part on the gradients corresponding to each pixel of the digital image. In some examples, the activity mask engine may generate the activity mask based at least in part on the high frequency map and the degree of randomness result that includes an activity value for each pixel. In some examples, the activity mask may further identify at least one granular area that generally corresponds to an area of neighboring pixels of the digital image having high activity values.

Furthermore, the printing device 200 comprises an image processing engine 216 to process the digital image by performing gray component replacement based at least in part on the activity mask to generate a color transformed image corresponding to the digital image. The example printing device 200 further comprises a print engine to print the color transformed image with one or more printheads 220 of the printing device. In some examples, the printing device may comprise a memory resource 222, such as a machine-readable storage medium. In these examples, the printing device 200 may store color transformation profiles 224. Generally, a color transformation profile 224 may correspond to a particular input color for a pixel, a particular activity value, and/or a particular gray component replacement level. Each color transformation profile 224 may indicate an adjustment to be applied to one or more color levels (where such adjustment may be applied to pixel values of the pixel corresponding to the color levels) of a respective pixel, where the adjustment corresponds to the gray component replacement level, the respective pixel is determined to have the corresponding activity value, and the pixel comprises the corresponding input color.

FIGS. 3-6 provide flowcharts that provide example sequences of operations that may be performed by an example computing device, such as a printing device, and/or a processing resource thereof to perform example processes and methods of the disclosure. In some examples, the operations included in the flowcharts may be embodied in a memory resource (such as the machine-readable storage medium 104 of FIG. 1) in the form of instructions that may be executable by a processing resource to cause the computing device (e.g., the computing device 100 of FIG. 1, the printing device 200 of FIG. 2, etc.) to perform the operations corresponding to the instructions. Additionally, the examples provided in FIGS. 3-6 may be embodied in computing devices, machine-readable storage mediums, processes, and/or methods. In some examples, the example processes and/or methods disclosed in the flowcharts of FIGS. 4 and 5 may be performed by one or more engines implemented in a computing device, such as the example engines 204-218 of FIG. 2.

Figure 3:
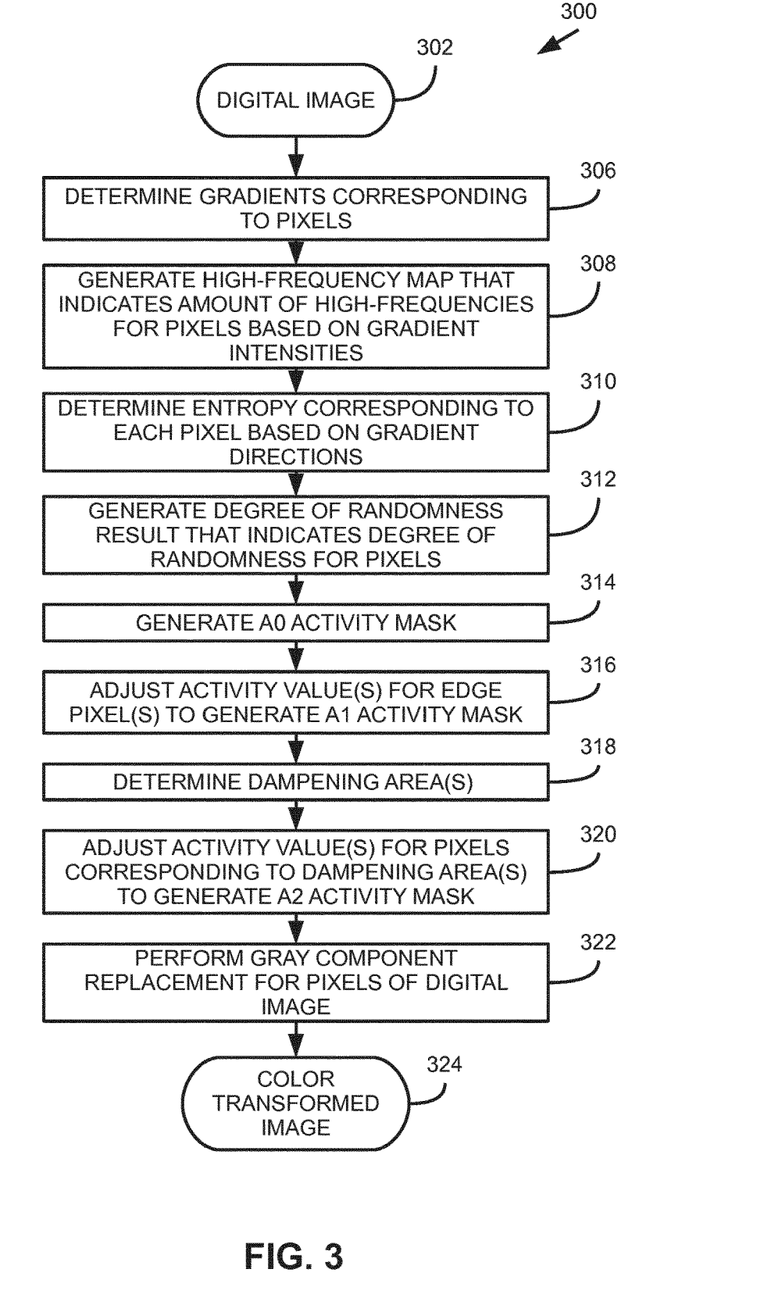
FIG. 3 is a flowchart that illustrates an example sequence of operations that may be performed by an example computing device.

Turning now to FIG. 3, this figure provides a flowchart 300 that illustrates an example sequence of operations that may be performed by an example computing device to process a digital image 302. In this example, the computing device may determine gradients corresponding to each pixel (block 306). In some examples, the gradients corresponding to each pixel may be determined based at least in part on a luminance for each pixel of the digital image. In some examples, a pixel may comprise a pixel value corresponding to a luminance value, and in other examples a luminance value may be determined based on one or more other pixel values for the pixel. For example, in the L*a*b color space, a pixel may comprise a luminance pixel value. In general, gradients for a pixel correspond to a change in intensity or color of the digital image associated with the pixel. In some examples, horizontal and vertical gradients corresponding to each pixel may be determined for the digital image by convolving a luminance value of each pixel of the digital image with a [−1, 1] kernel. In some examples, horizontal and vertical gradients ($\nabla p$) for a pixel (p) may be determined based at least in part on the following example equation:

$$\nabla p = \left(\frac{\partial p}{\partial x}, \frac{\partial p}{\partial y}\right). \tag{1}$$

The example computing device generates a high-frequency map associated with the digital image based at least in part on the gradients that indicates an amount of high-frequencies corresponding to each pixel of the digital image (block 308). In some examples, the computing device may determine a gradient intensity for each pixel, where the gradient intensity ($\Delta p$) may be dampened. In some examples, the gradient intensity may be dampened by taking a $4^{th}$ root, which may be expressed based at least in part on the following example equation:

$$\Delta p = \sqrt[4]{\frac{\partial p^2}{\partial x} + \frac{\partial p^2}{\partial y}}. \tag{2}$$

The gradient intensity ($\Delta p$) may be summed over a region of neighboring pixels (which may be referred to as a neighborhood of pixels) to generate a high-frequency map (HF(p)), which indicates an amount of high-frequencies corresponding to each pixel of the digital image. A size of a neighborhood may be based at least in part on a resolution of a printing device for which the digital image may be loaded for printing. In some examples, a neighborhood of pixels may have a size of approximately 1 mm². In some examples, a computing device may generate the high-frequency map (HF(p)) based at least in part on the following example equation:

$$HF(p) = \Sigma_{i,j=-n/2}^{n/2} \Delta p_{i,j}, \quad (3)$$

where n corresponds to a number of pixels in the pixel neighborhood.

The computing device determines entropy corresponding to each pixel based at least in part on the gradients corresponding to each pixel (block 310). In some examples, the computing device may determine a gradient direction for the gradients corresponding to each pixel, where the computing device may quantize the gradient directions into Q primary directions in the interval [0, 2π]. For each pixel (p), the computing device may determine a local histogram of gradient directions in the pixel neighborhood corresponding to the pixel, and the entropy corresponding to each pixel may be determined based at least in part on the local histogram of gradient directions.

The computing device may determine a degree of randomness corresponding to each pixel (block 312) based at least in part on the entropy corresponding to each pixel. Generally, a pixel having a higher corresponding entropy is a pixel having a higher degree of randomness. In some examples, the degree of randomness for a pixel may be determined based at least in part on the entropy corresponding to the pixel. In some examples, the computing device may determine the entropy (E(p)) and a degree of randomness corresponding to each pixel based at least in part on the following example equation:

$$E(p) = -\Sigma_{i=1}^{Q} h_i(p) \cdot \log(h_i(p)), \quad (4)$$

where $h_i$ is the occurrence of frequency of bin i.

The computing device generates an initial activity mask ($A_0$) for the digital image based at least in part on the high-frequency map and the degree of randomness result (block 314). Generally, the activity mask includes an activity value for each pixel of the digital image, where neighboring pixels of the digital image having relatively higher activity values may correspond to a granular area. In some examples, a granular area generally corresponds to an area of pixels of the digital image having higher amounts of high-frequencies and higher degrees of randomness, where amounts of each that may be considered high may be predefined and/or may be a relative relationship for pixels of the digital image. In some examples, the activity mask ($A_0$) may be applied to the digital image during processing of the digital image. Some examples may determine the initial activity mask based at least in part on the following example equation:

$$A_0(p) = HF(p) \cdot E(p) \quad (5)$$

In some examples, the computing device may adjust activity values in the activity mask for pixels corresponding to edges in the digital image (block 316) to generate another activity mask ($A_1$). In some examples, the computing device may determine a local minimum for corner super-pixels of pixel neighborhoods associated with edges of the digital image. In general, a super-pixel refers to a plurality of pixels corresponding to a particular feature of an image. In examples described herein, a super-pixel may be determined for edge features included in the digital image. In such examples, the activity value of pixels of the super-pixel associated with an edge of the digital image may be reduced to a local minimum of the pixel neighborhood corresponding to the pixels. In general, some activity values of the initial activity mask $A_0$ may be reduced to generate the $A_1$ activity mask. In some examples the computing device may apply the $A_1$ activity mask to the digital image during processing of the digital image. Some examples may adjust activity values of the $A_0$ mask to generate the $A_1$ activity mask based at least in part on the following equation:

$$A_1(p) = \min_{k=n/2}(A_0(P_{i\pm k,j\pm k})). \quad (6)$$

In some examples, the computing system may adjust the $A_1$ activity mask based at least in part on pixel values of pixels of the digital image. For example, the computing device may determine dampening areas of the digital image (block 318) based at least in part on pixel values of pixels of the digital image. In general, dampening areas of the digital image may correspond to areas of the digital image for which gray component replacement may be minimized and/or performed at a relatively lower level as compared to other areas. For example, the computing device may analyze the digital image to determine areas of the digital image corresponding to skin-tone areas and/or areas of the digital image corresponding to synthetic image areas. The computing device may adjust activity values for pixels corresponding to the dampening areas in the $A_1$ activity mask to generate another activity mask ($A_2$) (block 320). For example, if the computing device determines skin-tone areas and/or synthetic image areas, the computing device may generate masks for the digital image corresponding to the skin-tone areas ($M_{SkinTones}$) and/or the synthetic areas ($M_{Synthetics}$). Generally, such masks may identify areas of the digital image corresponding to skin-tones and/or synthetics. In some examples, the $A_2$ may be generated based at least in part on the following example equation:

$$A_2 = A_1 \cdot M_{SkinTones} \cdot M_{Synthetics}. \quad (7)$$

In some examples, the $A_2$ may be referred to as a final activity mask. Furthermore, the computing device may process the digital image by applying the $A_2$ activity mask to the digital image to perform gray component replacement for pixels of the digital image based at least in part on activity values of the pixels indicated in the activity mask (block 322). As shown, in these examples, the computing device generates the color transformed image 324 by performing the gray component replacement as described.

Figure 4:
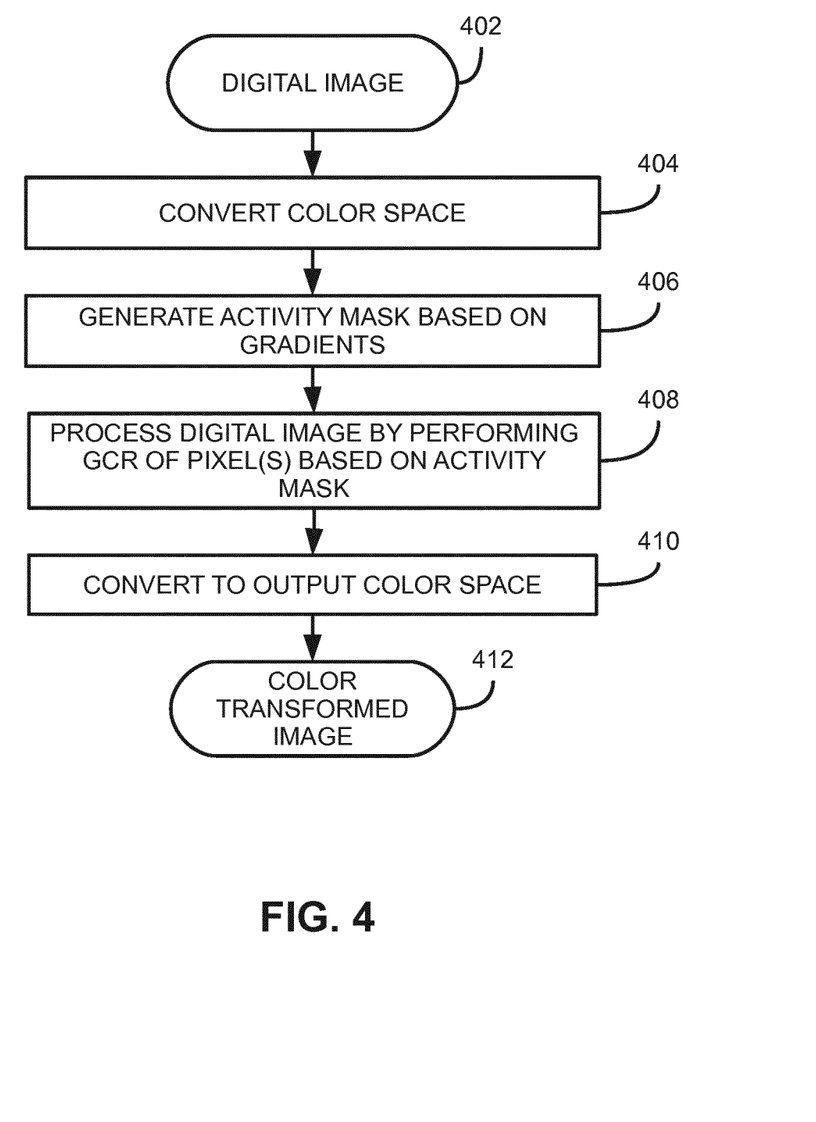
FIG. 4 is a flowchart that illustrates an example sequence of operations that may be performed by an example computing device.

Turning now to FIG. 4 this figure provides a flowchart 400 that illustrates an example sequence of operations that may be performed by a computing device to process a digital image 402. As shown, the computing device may convert the color space of the digital image (block 404). For example, the digital image may be in the red, green, blue (RGB) color space, and the computing device may convert the digital image to the L*a*b* color space (which may also be referred to as the Lab color space). As another example, the digital image may be in the CMYK color space, and the computing device may convert the digital image to the L*a*b* color space. The computing device may generate an activity mask for the digital image based at least in part on gradients corresponding to pixels of the digital image (block 406), where the activity mask generally indicates an activity value for each pixel of the digital image. Based on the activity mask, the computing device processes the digital image by performing gray component replacement for some pixels of the digital image (block 408). The processed image may be converted to an output color space (block 410) to thereby generate the color transformed image 412. For example, the processed image may be converted to a color space associated with printing and/or output of the digital image. Continuing the example, the processed digital image may be converted from a L*a*b* color space to a CMYK color space for printing with a printing device configured for CMYK printing.

Figure 5:
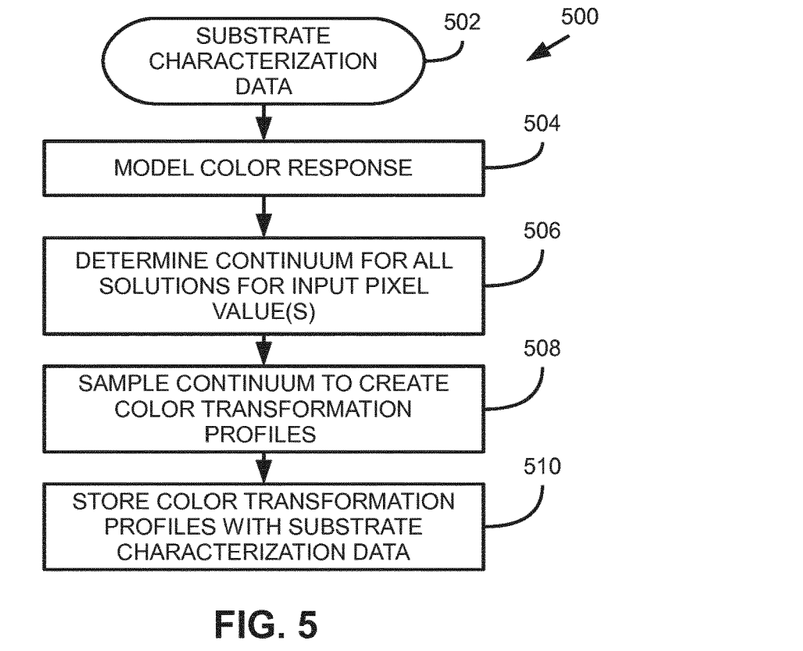
FIG. 5 is a flowchart that illustrates an example sequence of operations that may be performed by an example computing device.

FIG. 5 provides a flowchart 500 that illustrates an example sequence of operations that may be performed by a computing device. In some examples described herein, the digital image may be print content for a printing device, and processing of the digital image may be performed prior to printing thereof to thereby reduce printing material usage. In such examples, a characteristics of media (also referred to as a substrate) upon which the digital image may be printed may affect print quality. Therefore, in some examples, based on substrate characterization data 502, a computing device may model a color response corresponding to printing of the digital image (block 504). Generally, substrate characterization data may include information about the substrate, such as weight, gloss, opacity, finish, brightness, and/or other such characteristics that may influence color response of printing content. In some examples, the digital image may correspond to the CMYK color space, and modeling the color response may be based at least in part on the following equation:

$$\vec{f}(C,M,Y,K) = \overrightarrow{Lab}. \tag{8}$$

As will be appreciated, for gray component replacement, a plurality of combinations of color levels may achieve an approximate visual output—i.e., a black color level may be increased as other color levels are decreased to visually approximate a gray color output. Therefore, the combinations of color levels that achieve the approximately common output may be considered solutions for gray component replacement of an input color. Generally, increasing black color levels and decreasing other color levels correspond to relatively higher gray component replacement levels. The computing device may determine a continuum of gray component replacement solutions for input pixel values of each pixel of the digital image (block 506). Some examples may determine the continuum of solutions based at least in part on the following example equation:

$$\min_{CMY} \|\vec{f}(C,M,Y,K_i) - Lab\|, \tag{9}$$

where $\|.\|$ corresponds to a color difference between an input color and the solution, e.g., delta-E 1976 ($dE_{76}$), and $K_{in} < K_i$.

The computing device may sample the continuum of solutions to create color transformation profiles (block 508), and the computing device may store the color transformation profiles in a memory resource with the substrate characterization data. Generally, each color transformation profile: preserves the original (i.e., input) color gamut; does not contaminate primary and secondary colors; does not modify color appearance; and modifies the inherent black color generation strategy. As will be appreciated, a color transformation profile may be generated for each possible input color (as determined by the modeled color response), each possible activity level, and each possible gray component replacement level by sampling the continuum of solutions. For example, if ten levels of gray component replacement are to be implemented for the process, the computing device may uniformly sample the continuum of solutions to determine ten color transformation profiles for each input color and activity value. Furthermore, an input color generally refers to a color as represented by discrete pixel values corresponding to each color level for a pixel. For example, in the CMYK color space, an example pixel may comprise a cyan pixel value corresponding to a cyan color level, a magenta pixel value corresponding to a magenta color level, a yellow pixel value corresponding to a yellow color level, and a black pixel value corresponding to a black color level. Based on the pixel values of the example pixel, the input color of the example pixel may be defined as the combination of the color levels represented by the cyan pixel value, magenta pixel value, yellow pixel value, and black pixel value.

Figure 6:
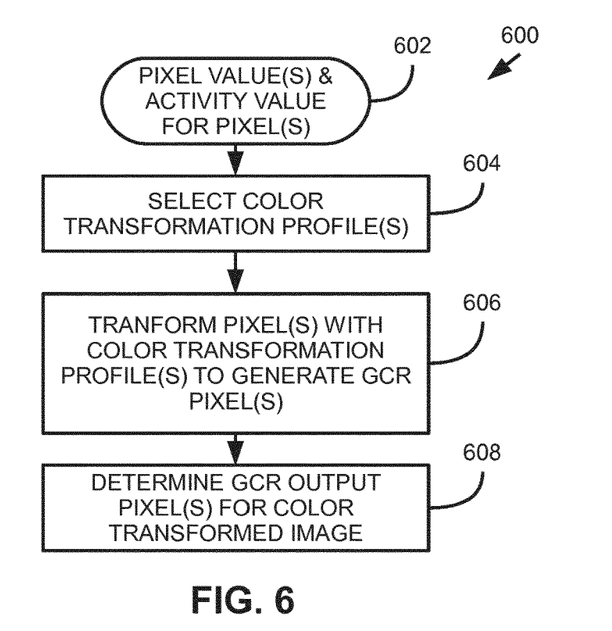
FIG. 6 is a flowchart that illustrates an example sequence of operations that may be performed by an example computing device.

FIG. 6 provides a flowchart 600 that illustrates an example sequence of operations that may be performed by a computing device to process pixels of a digital image by performing gray component replacement. As shown, based on pixel values and activity values for the pixels 602, the computing device may select one or more color transformation profiles for each pixel. For example, for a pixel (P0) having a given activity value (A) indicated by the activity mask, the computing device may select a set of color transformation profiles corresponding to the activity value A and the input color of the pixel. Furthering the example, if P0 comprises a cyan pixel value $C_0$, a magenta pixel value $M_0$, a yellow pixel value $Y_0$, and a black pixel value $K_0$, the computing system may select a set of color transformation profiles associated the input color ($C_0$, $M_0$, $Y_0$, $K_0$) and the activity level A. In some examples, the computing device may select a first color transformation profile ($CTP_1$) associated with the input color and having an activity value lower than activity value A (which may be referred to as $A_-$), and the computing device may select a second color transformation profile ($CTP_2$) associated with the input color and having an activity value higher than activity value A (which may be referred to as $A_+$).

The computing device may determine, for each pixel, a gray component replacement (GCR) pixel based on the one or more color transformation profiles selected for the pixel (block 606). Generally, each color transformation profile selected for the pixel may define an increase in a black color level and a corresponding decrease in one or more other color levels, and determining a GCR pixel based on a color transformation profile may comprise adjusting pixel values of the pixel associated with the respective color levels. For example, referring to the above provided example, the computing device may apply the $CTP_1$ to pixel P0 to thereby adjust the pixel values and generate a first gray component replacement pixel associated with P0 (which may be referred to as $P0_{GCR1}$). Similarly, in this example, the computing device may apply the $CTP_2$ to pixel P0 to thereby adjust the pixel values and generate a second gray component replacement pixel associated with P0 (which may be referred to as $P0_{GCR2}$). The example operations may be expressed in the following example equations:

$$(C_0, M_0, Y_0, K_0) \& CTP_1 \rightarrow (C_{01}, M_{01}, Y_{01}, K_{01}) = P0_{GCR1}. \tag{10}$$

$$(C_0, M_0, Y_0, K_0) \& CTP_2 \rightarrow (C_{02}, M_{02}, Y_{02}, K_{02}) = P0_{GCR2}. \tag{11}$$

In this example, the black color level (and black pixel value) of $P0_{GCR1}$ and $P0_{GCR2}$ is greater than the black color level of the input pixel P0. Similarly, for the example, the other color levels of $P0_{GCR1}$ and $P0_{GCR2}$ are less than the corresponding color levels of the input pixel P0. Generally, the $CTP_2$ corresponds to a higher level of gray component replacement as compared to $CTP_1$. A higher level of gray component replacement may be performed for a higher activity value without noticeable visual inaccuracy. The relationship of color levels and pixel values may be expressed in the following example equations:

$$C_{02} < C_{01} < C_0,$$

$$M_{02} < M_{01} < M_0;$$

$$Y_{02} < Y_{01} < Y_0;$$

$$K_{02} > K_{01} > K_0. \quad (12)$$

The computing device determines, for each pixel, a GCR output pixel based on the GCR pixels generated for each pixel with the color transformation profiles (block 608). In some examples, the computing device may select one color transformation profile for each pixel, and the GCR output pixel for each pixel may be determined therefrom. In other examples, the computing device determines more than one color transformation profile for each pixel, and, in these examples, the computing device generates more than one GCR pixel for each pixel, and the GCR output pixel may be determined based at least in part on the more than one GCR pixels for each pixel. Referring to the example described above, the GCR output pixel corresponding to P0 may be $P0_{GCR1}$ or $P0_{GCR2}$. In similar examples, based on printing material resource availability, output quality, printing speed, processing resource availability, and/or other such factors, the computing device may select a particular GCR pixel as the GCR output pixel. As another example, the GCR output pixel ($P0_{GCROUT}$) may be determined based on $P0_{GCR1}$ and $P0_{GCR2}$. For example, the computing device may determine the GCR output pixel by linear interpolation of $P0_{GCR1}$ and $P0_{GCR2}$, which may be expressed in the following example equations:

$$\alpha = \frac{(A - A_-)}{A_+ - A_-}; \quad (13)$$

$$P0_{GCROUT} = (\alpha * P0_{GCR2}) + (1 - \alpha) P0_{GCR1}.$$

In general, performing gray component replacement for the digital image may comprise determining a GCR output pixel for each pixel in a manner similar to the example process described with respect to FIG. 6. As will be appreciated, the activity value of each pixel indicated by the activity mask may identify at least one area of granular visual characteristics. Generally, pixels corresponding to areas of granular visual characteristics, such as areas of high-frequency random noise, in the digital image may be processed with higher levels of gray component replacement as compared to other pixels of the digital image, where gray component replacement in pixels of granular areas may be less perceptible to visual inspection, such as when the digital image is printed by a printing device. Generally, the activity value of each pixel is determined based at least in part on gradients corresponding to the pixel, where the activity level of each pixel may reflect a level of graininess, granular visual characteristics, and/or high-frequency random noise associated with the pixel and a level of gray component replacement that may performed for the pixel.

Figure 7:
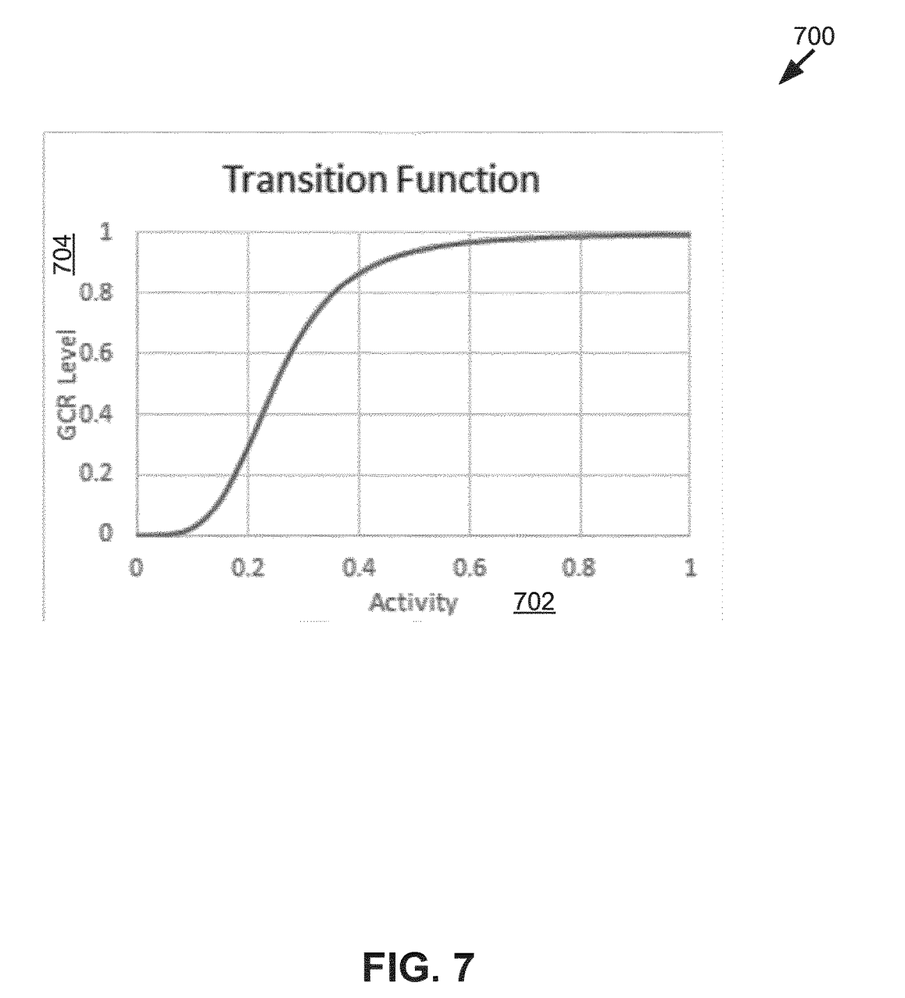
FIG. 7 is an example chart that illustrates an example relationship between an example activity value and an example gray component replacement level.
Figure 8A:
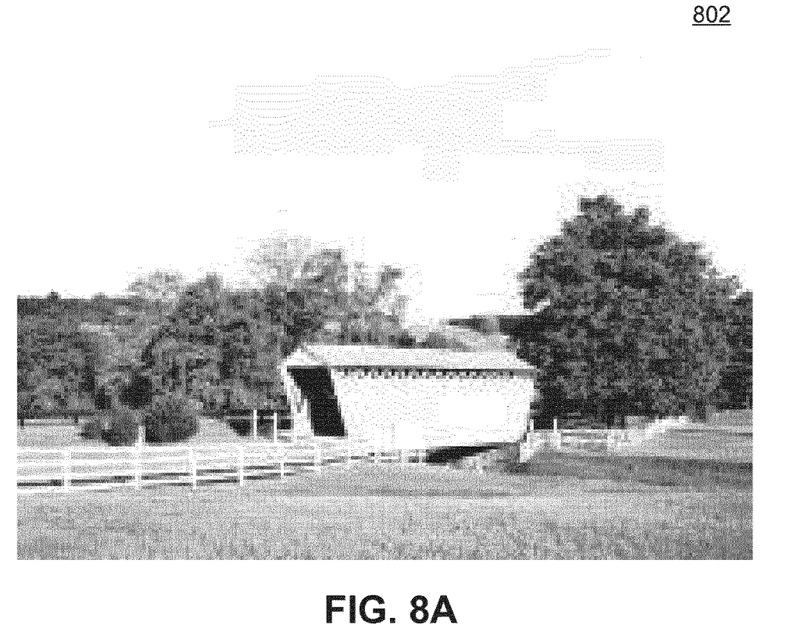
FIGS. 8A-B are images that illustrate an example levels of gray component replacement that may be performed by an example computing device.
Figure 8B:
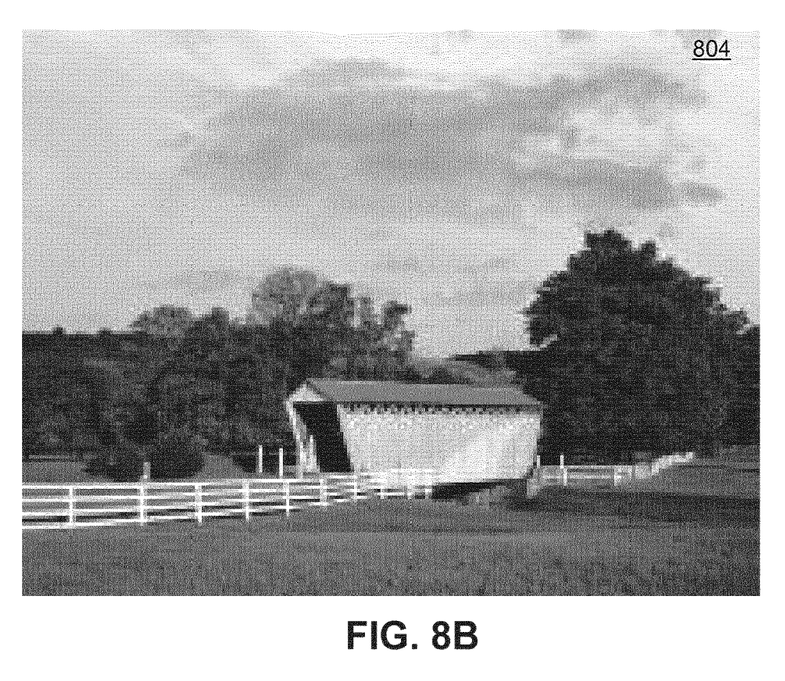

FIG. 7 provides an example chart 700 that illustrates an example relationship between activity value 702 and gray component replacement level that may be implemented in some examples. Generally, increasing levels of gray component replacement correspond to increasing black color levels and a corresponding decrease of other color levels. Therefore, as shown in this example, as activity increases, increasing levels of gray component replacement may be performed. In turn, increased levels of gray component replacement may correspond to a reduction in printing material usage when printing the digital image. FIGS. 8A-B provide diagrammatic illustrations 802, 804 of increasing levels of black color corresponding to increasing levels of gray component replacement. In the example shown, the diagrammatic illustration 802 of FIG. 8A comprises a lower level of black color as compared to the diagrammatic illustration 804 of FIG. 8B. Generally, FIG. 8A may correspond to a lower level of gray component replacement and FIG. 8B may correspond to a higher level of gray component replacement.

Therefore, examples of computing devices, processes, methods, and/or computer program products implemented as executable instructions stored on a non-transitory machine-readable storage medium described herein may process digital images to generate a color transformed image by performing gray component replacement for pixels based at least in part on activity values for the pixels. As will be appreciated, such processing may be performed prior to printing the digital image. In such examples, the printing of the color transformed image may reduce printing material usage in printing. Moreover, examples described herein generally perform higher level gray component replacement in areas of a digital image associated with high-frequency and random noise, such that visual appearance of the printed color transformed image may not be noticeably altered. Since gray component replacement may be applied variable to pixels of a digital image based on activity value of the pixels, gray component replacement contemplated by examples described herein may be referred to as adaptive gray component replacement. As will be appreciated, such adaptive gray component replacement may facilitate a dynamic balancing between printing material usage and visual output quality by varying application of such gray component replacement based on pixel activity values and performing higher levels of gray component replacement in areas of a digital image corresponding to granular visual characteristics.

In addition, while various examples are described herein, elements and/or combinations of elements may be combined and/or removed for various examples contemplated hereby. For example, the example operations provided herein in the flowcharts of FIGS. 3-6 may be performed sequentially, concurrently, or in a different order. Moreover, some example operations of the flowcharts may be added to other flowcharts, and/or some example operations may be removed from flowcharts. Furthermore, in some examples, various components of the example computing devices of FIG. 1 and/or the printing device of FIG. 2 may be removed, and/or other components may be added. Similarly, in some examples various instructions of the example memories and/or machine-readable storage mediums of FIG. 1 may be removed, and/or other instructions may be added (such as instructions corresponding to the example operations of FIGS. 3-6).

The preceding description has been presented to illustrate and describe examples of the principles described. This description is not intended to be exhaustive or to limit examples to any precise form disclosed. Many modifications and variations are possible in light of this description.

The invention claimed is:

1. A non-transitory machine-readable storage medium comprising instructions executable by a processing resource of a computing device to cause the computing device to:

analyze a digital image to determine an amount of high frequencies corresponding to each pixel of the digital image based at least in part on gradients corresponding to a pixel neighborhood of each pixel;

analyze the digital image to determine a degree of randomness for each pixel based at least in part on the corresponding gradients;

generate an activity mask for the digital image that identifies a granular area based at least in part on the amount of high frequencies corresponding to each pixel and the degree of randomness for each pixel; and process each pixel of the digital image by performing gray component replacement to generate a color transformed image based at least in part on the granular area identified by the activity mask.

2. The non-transitory machine-readable storage medium of claim 1, wherein the instructions to process each pixel of the digital image to generate the color transformed image comprise instructions to:

adjust at least one color level of the digital image in the granular area based at least in part on the activity mask.

3. The non-transitory machine-readable storage medium of claim 2, wherein the at least one color level corresponds to a black color level.

4. The non-transitory machine readable storage medium of claim 2, wherein the at least one color level is increased, and the instructions to process each pixel of the digital image to generate the color transformed image comprise instructions to:

decrease at least one other color level.

5. The non-transitory machine readable storage medium of claim 1, wherein the color transformed image corresponds to a color space comprising cyan color, magenta color, yellow color, and black color, and the instructions to process each pixel of the digital image to generate the color transformed image comprise instructions to:

decrease a color level of the cyan color, magenta color, and yellow color in the granular area; and increase a color level of the black color in the granular area.

6. The non-transitory machine readable storage medium of claim 1, wherein amount of high frequencies corresponding to each pixel are determined based at least in part on gradient intensities of the corresponding gradients, and the degree of randomness for each pixel is determined based at least in part on gradient directions of the corresponding gradients.

7. The non-transitory machine-readable storage medium of claim 1, further comprising instructions to cause the processing resource to:

analyze the digital image to determine a local minimum for corner super-pixels of pixel neighborhoods associated with edges of the digital image, wherein the activity mask for the digital image is generated based at least in part on the local minimum for corner super-pixels of the pixel neighborhoods associated with the edges of the digital image.

8. The non-transitory machine-readable storage medium of claim 1, wherein the non-transitory machine-readable medium further comprises instructions to cause the processing resource to:

for each pixel of the digital image, analyze the neighborhood of pixels corresponding to the pixel to determine a magnitude and direction of each gradient.

9. The non-transitory machine-readable storage medium of claim 1, wherein the digital image corresponds to a first color space and the instructions to process the digital image to generate a color transformed image comprises instructions to cause the processing resource to:

convert the digital image from the first color space to a second color space for the color transformed image.

10. The non-transitory machine-readable storage medium of claim 1, wherein the activity mask indicates an amount of activity corresponding to each pixel, and the instructions to process each pixel of the digital image to generate the color transformed image comprise instructions to:

select, for each pixel, a color transformation profile from a plurality of color transformation profiles based at least in part on the amount of activity corresponding to the pixel, wherein each color transformation profile of the plurality corresponds to a respective level of gray component replacement; and generate a gray component replacement pixel for each pixel based at least in part on the selected color transformation profile, wherein the color transformed image comprises the gray component replacement pixel generated for each pixel.

11. The non-transitory machine-readable storage medium of claim 1 comprising instructions executable by a processing resource of a printing device to cause the printing device to print the color transformed image.

12. A system in a printing device implementing the non-transitory machine-readable storage medium of claim 11.

13. A printing device comprising:

a printhead;

a pixel gradient engine to analyze pixels of a digital image to determine gradients corresponding to each pixel of the digital image;

an activity mask engine to generate an activity mask for the digital image based at least in part on the gradients corresponding to each pixel of the digital image, the activity mask including an activity value for each pixel;

an image processing engine to process the digital image by performing gray component replacement based at least in part on the activity mask to generate a color transformed image corresponding to the digital image; and a print engine to print the color transformed image with the printhead; and wherein:

the image processing engine to process the digital image to generate the color transformed image comprises the image processing engine to:

select, for each pixel of the digital image, a respective set of color transformation profiles from a plurality of color transformation profiles based at least in part on an activity value of the pixel, wherein each color transformation profile corresponds to a respective level of gray component replacement; and generate a gray component replacement pixel corresponding to each pixel of the digital image based at least in part on the respective set of color transformation profiles selected for each pixel, the color transformed image comprising the gray component replacement pixel corresponding to each pixel of the digital image.

14. A method comprising:

analyzing, with a processing resource, a plurality of pixels of a digital image to determine gradients corresponding to each pixel of the plurality based at least in part on a pixel value of each pixel;

generating, with the processing resource and based at least in part on the corresponding gradients, a high frequency map for the digital image that indicates an amount of high frequencies corresponding to each pixel of the plurality;

determining a degree of randomness corresponding to each pixel of the plurality based at least in part on the corresponding gradients;

generating an activity mask based at least in part on the high frequency map and the degree of randomness corresponding to each pixel of the plurality, the activity mask comprising an activity value for each pixel of the digital image that is based on the amount of high frequencies corresponding to each pixel and the degree of randomness corresponding to each pixel, the activity mask identifying at least one granular area of the digital image that comprises a set of pixels having relatively higher activity values;

processing, with the processing resource, the digital image with the activity mask to generate a color transformed image by performing adaptive gray component replacement in the at least one granular area of the digital image; and printing the color transformed image.

15. The method of claim 14, wherein the activity mask is a final activity mask, and generating the final activity mask comprises:

generating a first activity mask by multiplying the high frequency map and the degree of randomness corresponding to each pixel to generate the activity value for each pixel;

adjusting the activity value, for each edge pixel, in the first activity mask by reducing the activity value for the edge pixel to a pixel neighborhood local minimum associated with the edge pixel to generate a second activity mask;

analyzing the digital image to determine at least one dampening area of the digital image based at least in part on the pixel value of each pixel; and decreasing the activity value for each pixel corresponding to the at least one dampening area in the second activity mask to thereby generate the final activity mask.

16. The method of claim 14, further comprising:

modeling a color response of a printing device based on substrate characterization data associated with the printing device;

determining a continuum of solutions for input pixel values based at least in part on the color response;

sampling the continuum to generate a plurality of color transformation profiles associated with the printing device;

storing the color transformation profiles and substrate characterization data in a memory resource associated with the processing resource, each color transformation profile of the plurality is associated with a respective pixel value, a respective activity level, and a respective gray component replacement level, wherein processing the digital image with the activity mask to generate a color transformed image is based at least in part on a subset of color transformation profiles of the plurality.

* * * * *

UNITED STATES PATENT AND TRADEMARK OFFICE
CERTIFICATE OF CORRECTION

PATENT NO. : 10,356,283 B2
APPLICATION NO. : 15/569328
DATED : July 16, 2019
INVENTOR(S) : Noam Shaham et al.

Page 1 of 1

It is certified that error appears in the above-identified patent and that said Letters Patent is hereby corrected as shown below:

In the Claims

In Column 13, Line 25, in Claim 4, delete "machine readable" and insert -- machine-readable --, therefor.

In Column 13, Line 31 approx., in Claim 5, delete "machine readable" and insert -- machine-readable --, therefor.

In Column 13, Line 41, in Claim 6, delete "machine readable" and insert -- machine-readable --, therefor.

In Column 14, Line 23, in Claim 11, delete "claim 1" and insert -- claim 1, --, therefor.

Signed and Sealed this
Seventh Day of January, 2020

Andrei Iancu
*Director of the United States Patent and Trademark Office*